United States Patent [19]

Woodhull

[11] 4,299,198
[45] Nov. 10, 1981

[54] WIND POWER CONVERSION AND CONTROL SYSTEM

[76] Inventor: William M. Woodhull, 1815 Ridge Rd., Ontario, N.Y. 14519

[21] Appl. No.: 76,370

[22] Filed: Sep. 17, 1979

[51] Int. Cl.³ .............................................. F28D 15/00
[52] U.S. Cl. ....................................... 126/247; 60/398; 60/641.1; 415/2 R; 417/334
[58] Field of Search .................. 60/398, 641; 126/247; 416/43; 122/26; 415/2, 3, 4; 417/334, 335, 336; 290/55

[56] References Cited

U.S. PATENT DOCUMENTS

| | | | |
|---|---|---|---|
| 2,485,543 | 10/1949 | Andreau | 60/398 |
| 3,822,740 | 7/1974 | Hackett | 126/247 X |
| 3,952,723 | 4/1976 | Browning | 60/641 X |
| 3,989,189 | 11/1976 | Kita | 126/247 X |
| 4,114,809 | 9/1978 | Sampson | 126/247 X |
| 4,143,522 | 3/1979 | Hamrick et al. | 126/247 X |

Primary Examiner—Allen M. Ostrager
Attorney, Agent, or Firm—Robert J. Bird

[57] ABSTRACT

A combination wind rotor and output energy transducer to provide output energy from the system and to automatically regulate the wind rotor at all wind velocities to thereby allow the wind rotor to operate at a constant tip speed/wind velocity ratio and at its maximum efficiency. The energy transducer is a combination of positive displacement hydraulic pump and an orifice in the hydraulic system to generate heat. Overspeed protection is afforded by maximum hydraulic loading of the wind rotor in extreme wind conditions.

A wind rotor steering system by which the wind rotor is oriented into the wind at all wind velocities. The wind rotor restoring torque is automatically in balance with its reaction torque.

5 Claims, 4 Drawing Figures

FIGURE 3. LOAD-LINE ANALYSIS FOR OPTIMUM OPERATION
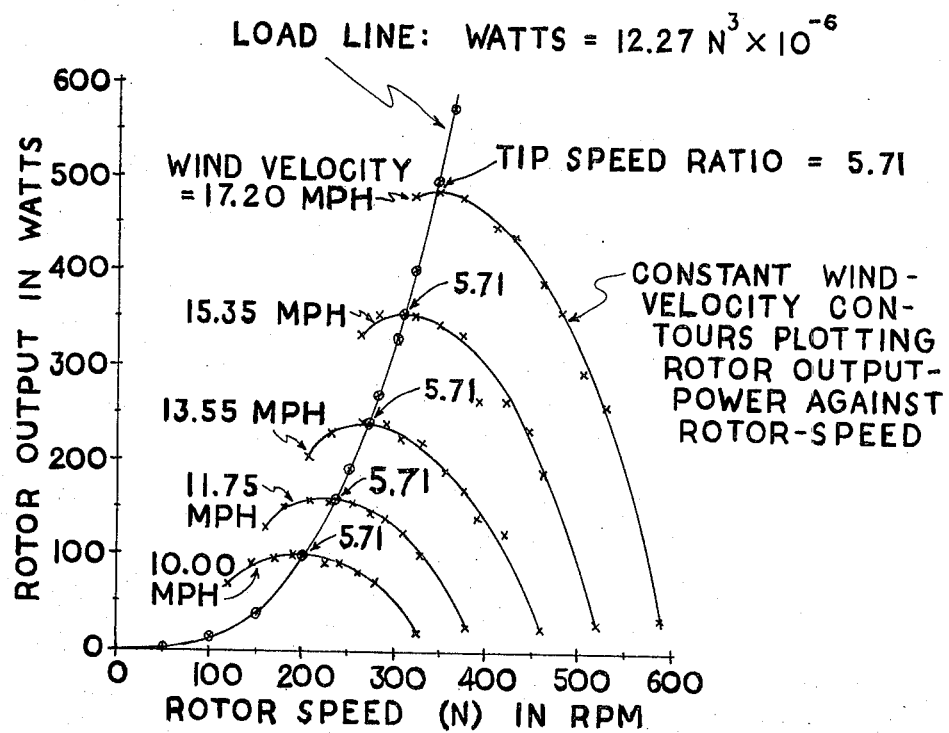
FIGURE 4
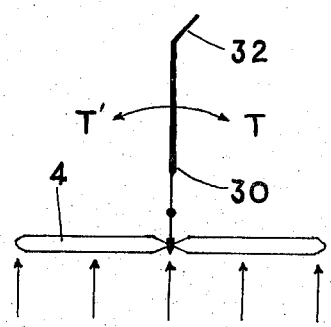

WIND POWER CONVERSION AND CONTROL SYSTEM

BACKGROUND AND SUMMARY OF THE INVENTION

The invention relates to a wind rotor or wind power system, and more specifically to a combination of wind rotor and energy transducer to provide desired output from the system and to automatically regulate the wind rotor.

The invention further relates to an improved wind rotor steering system.

Windmills have been used for centuries for various purposes, especially for lifting water. More recently windmills have been used to drive electrical generators. In such systems, the generator load characteristic does not follow, or even relate to, the power output characteristic of the wind rotor. In the present system, a wind rotor is combined with a load which matches the power characteristic of the rotor so that the rotor is optimally loaded at all times. In the present invention, wind power is converted to mechanical power to drive a positive displacement hydraulic pump and then to heat. The pump moves hydraulic fluid through a closed loop including an orifice causing heat to be generated, and a heat exchanger to extract the heat for practical use.

The invention can be summarized as a wind power system including a wind rotor with an output energy transducer which provides both a desired useful energy output and automatic optimal loading of the wind rotor at all wind velocities. The same energy transducer automatically provides the wind rotor shaft with a reaction torque which is always in balance with the restoring torque produced by the wind rotor tail. The energy transducer is a combination of positive displacement hydraulic pump and an orifice, the discharge of fluid through which generates useful heat. Overspeed protection for the wind rotor is provided by maximum hydraulic loading of the system in extreme wind conditions.

The details, operation, and benefits of the present invention will now be described more specifically with reference to the accompanying drawing.

DRAWING

FIG. 3 is a family of curves plotting an experimental wind rotor power against its speed at several constant wind velocities.

FIG. 4 is a top view of a wind rotor and tail, somewhat exaggerated as to proportion and angle, and representing a stable wind/rotor condition.

DESCRIPTION

Figure 1:
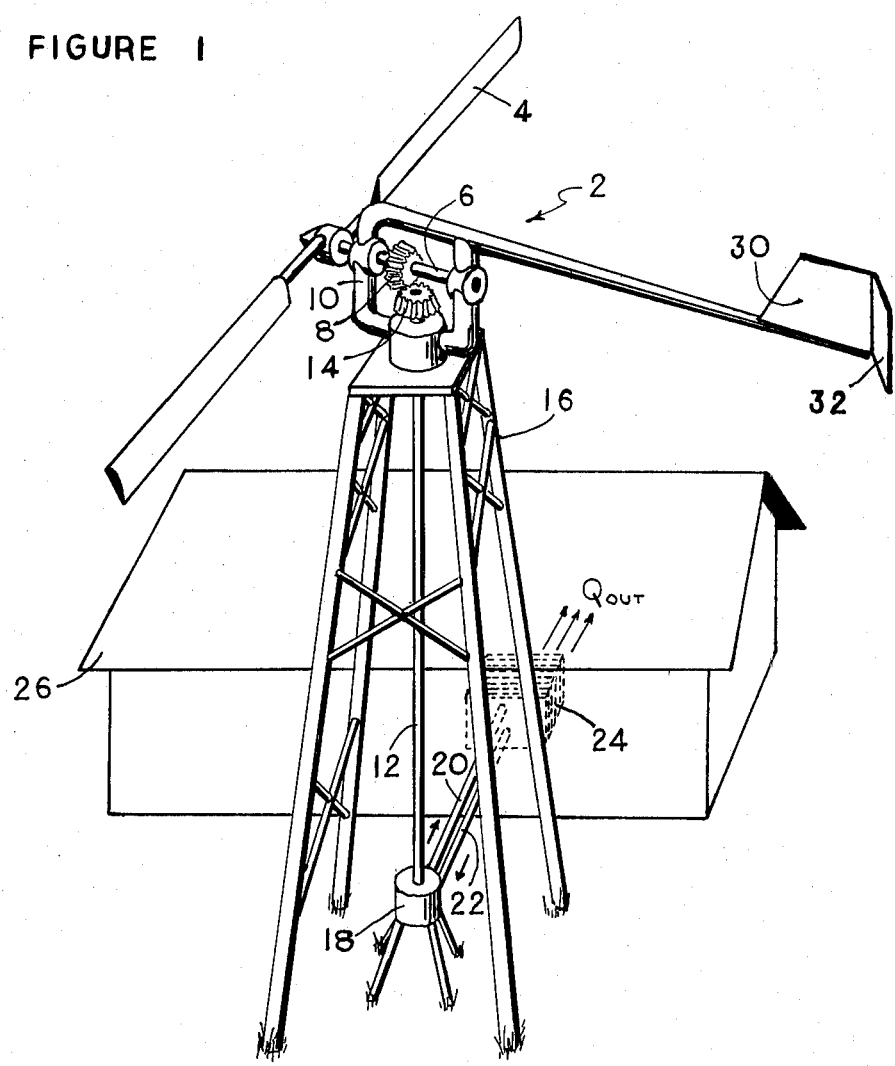
FIG. 1 is a somewhat schematic representation of a wind power system according to this invention, shown in its intended environment.

FIG. 1 shows a wind power system including a wind rotor in association with a building in which thermal energy is extracted from the system.

The wind power unit generally indicated at 2 includes a wind rotor 4 mounted for rotation on a rotor shaft 6 which has a bevel gear 8 fixed thereto. Rotor 4 and rotor shaft 6 are mounted for rotation on a suitable carriage 10 which is in turn mounted for rotation relative to a drive shaft 12 which includes a bevel gear 14 in engagement with bevel gear 8. Rotor shaft 6 is horizontal; Drive shaft 12 is vertical. Wind rotor 4 and its carriage 10 are supported at an elevation from ground level on a suitable tower structure 16.

Drive shaft 12 is operatively connected to a positive displacement hydraulic pump 18. Pump 18 is connected to a discharge line 20 and a return line 22, extending respectively to and from a heat exchanger 24 within the building 26.

Heat exchanger 24 is schematically represented as giving up heat Q to the building space. In fact, the heat Q might be used in many ways, more likely stored in a liquid heat reservoir for circulation within the building as needed. The Q heat extraction shown in FIG. 1 is only schematic, shown that way for simplicity, and not really germane to the present invention. It is only important that heat Q be in some manner extracted or "exchanged" from the system.

Figure 2:
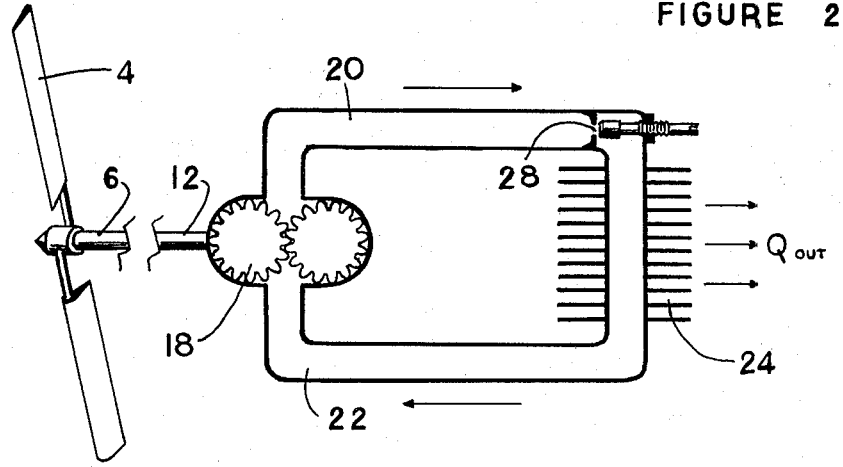
FIG. 2 is a schematic diagram of the hydraulic system of this invention.

FIG. 2 is another schematic diagram representing the wind rotor 4 as operatively connected to drive the hydraulic pump 18. The hydraulic system is shown in more detail to include discharge line 20, an orifice 28, heat exchanger 24, and return line 22, all in a closed loop with pump 18.

When pump 18 is operating, driven by the wind rotor, it motivates hydraulic fluid through the hydraulic system. The term "hydraulic fluid" is used herein generically to include oil, water emulsions, or any suitable liquid. The constriction at orifice 28 causes a fluid pressure drop where the energy is transformed to heat in quantity as determined by the product of flow rate and pressure drop. The size of the constriction of orifice 28 determines the loading on the pump 18 and this, in turn, on the wind rotor. High speed wind rotors develop maximum power and maximum efficiency at a rotor tip speed of some certain value in the range of 5–10 times wind velocity. This factor is called the tip speed ratio and is a constant, characteristic of a particular rotor. Conversely, optimum load on the wind rotor allows it to reach its optimum tip speed ratio. At tip speeds above and below this range the power from the wind rotor decreases. By providing a pump-orifice combination for maximum pump pressure, optimum load will be applied to the wind rotor. Note that this is true for all wind velocities.

The discharge and return lines 20, 22 are relatively large in inside area compared to the orifice 28 so that pipe friction is negligible. With this and the fact that the hydraulic fluid is practically incompressible, Bernoulli's Theorem will apply so that the hydraulic fluid, while traversing the orifice, will increase velocity head while losing pressure head, the sum of the two remaining constant. The pump will develop a pressure difference $\Delta P$ across orifice 28 proportional to the square of the volume flowrate. That is, $$\Delta P \propto Q^2 \qquad (1)$$

By the law of energy conservation and because the orifice is the only load, all of the pump output must be converted to heat, and this occurs when the fluid emerges from the orifice at zero gage pressure. Because of the increase in cross-sectional area downstream of the orifice, the fluid will lose its orifice-induced velocity and corresponding kinetic energy with no compensating increase in pressure head. Therefore the fluid temperature must increase.

Power W, which is the rate at which energy is converted into other forms (in this case heat) is proportional to the product of flowrate Q and pressure drop ΔP. That is, for the hydraulic loop, $$W \propto Q\Delta P \tag{2}$$

By substituting $Q^2$ from relationship (1) for P in relationship (2), it follows that $$W \propto Q^3 \tag{3}$$

Because the pump is a positive displacement pump, the volume flowrate Q directly follows the pump rotating speed N in revolutions per unit time. That is, $$Q \propto N \tag{4}$$

Therefore relationship (3) can be expressed in terms of pump speed N, substituting N for Q as follows:

$$W_{pump} \propto N^3 \tag{5}$$

The cubic nature of the relationship (5) is fortuitous because the power derived from the wind by the wind rotor also follows a cubic relationship to the wind velocity V as follows:

$$W_{rotor} \propto V^3 \tag{6}$$

Any wind rotor subjected to a given wind will turn at some speed, determined by the wind and by the load on the rotor. However the rotor efficiency will be at maximum when the tip speed ratio attains some certain value. This optimum tip speed ratio differs among various rotor types and designs; it is usually in the 5–10 range in the case of high speed, two blade type rotors. But for any given design, the optimum tip speed ratio is independent of wind velocity. Therefore, the rotor speed N of an optimally loaded wind rotor will directly follow the wind velocity V so that the tip speed ratio holds at its optimum value. Thus, at optimal loading, $$N_{rotor} \propto V \tag{7}$$

Substituting N for V in relationship (6) it is seen that $$W_{rotor} \propto N^3 \tag{8}$$

Relationship (8) states that rotor power W is proportional to the cube of rotor speed N and this corresponds with relationship (5) which states that pump power W is proportional to the cube of pump speed N. Pump and rotor are directly connected so that N is a common parameter. This can be stated another way: The rotor delivers a drive power on the shaft always proportional to $N^3$, while the pump reacts with an opposite brake power on the shaft always proportional to $N^3$. Thus the rotor drive power and the pump brake power are always inherently in proportion to each other, and this irrespective of wind velocity.

It remains only to fit a particular pump and orifice combination with its characteristic parameters of size and the like, to a particular wind rotor, with its characteristic parameters, to match the pump load to the rotor power at its optimal level.

The orifice 28 may be a fixed orifice, for indeed it will have but one size to produce, in a given system, the optimum effects described. However, orifice 28 may also be a variable orifice in the form of a spool valve or the like. The valve can be adjusted once for optimal loading of the system, and then set. A variable orifice 28 provides the additional benefit of a safety and equipment protection device. In excessive wind conditions, the variable orifice 28 can be closed in order to dead end the hydraulic system and stall the wind rotor. For this purpose, variable orifice 28 may be manually adjustable with an automatic override, responsive to extraordinary wind conditions to either close down the hydraulic system and thus the wind rotor, or to increase the hydraulic load to hold rotor speed at a maximum "red line" level.

FIG. 3 is a family of curves, each curve showing rotor power vs. rotor speed at a constant wind velocity. These curves and the accompanying data are experimental and are reported in the Kansas State College Bulletin, Volume XXX, Sept. 1, 1946 at pages 15–19. It will be seen that each of the curves has a maximum which indicates maximum rotor power and corresponds to a certain rotor speed for a given wind velocity. A tabulation of the data at each maximum point is as follows:

| Power (watts) | 100 | 160 | 242 | 355 | 485 |
|---|---|---|---|---|---|
| Rotor speed (RPM) | 200 | 235 | 271 | 307 | 344 |
| Wind velocity (MPH) | 10.11 | 11.75 | 13.55 | 15.35 | 17.20 |
| Tip Speed Ratio | 5.71 | 5.71 | 5.71 | 5.71 | 5.71 |

From this tabulation it is readily seen that the optimum power level corresponds to the same tip speed ratio for all of the several wind velocities. This substantiates the premise that the rotor speed of an optimally loaded wind rotor will directly follow the wind velocity so that the tip speed ratio holds at its optimum value.

The curve extending upward to the right, connecting all the maximum points, is the optimum load line of the wind rotor from which the data were taken. The empirical equation of this load line then is derived as $$W = 12.27 N^3 \times 10^{-6}$$

In other words, the optimum points on this curve do follow the proportionality relationship of power to the cube of rotor speed.

Referring back to FIG. 1 and to FIG. 4, the rotor steering system of this invention will now be described. The wind power unit includes a tail 30 mounted to the carriage 10 for rotation with carriage 10 on the tower. Tail 30 lies in the plane of the axis of the wind rotor. Tail 30 includes a trim tab 32 which is inclined to the plane of tail 30 in a direction such that it reacts to an axial wind to balance the effect of the reactive torque on the drive shaft resulting from power applied to drive the pump.

FIG. 4 represents a wind rotor at an equilibrium condition, facing an on-axis wind and with load-reaction torque T equal to restoring torque T' produced by the tail.

The reaction torque T of the pump on the drive shaft is proportional to pump pressure, and by relationship (1) is therefore proportional to the square of the flowrate $Q^2$.

$$T \propto Q^2 \tag{9}$$

Because flowrate Q follows pump speed N (relationship 4) and N follows wind velocity V (7), torque T is therefore also proportional to the square of wind velocity, $$T \propto V^2 \qquad (10)$$

Now, the restoring torque T' from the windmill tail is also proportional to $V^2$, $$T' \propto V^2 \qquad (11)$$

so that a single trim setting on the tail surface can balance T with T', thus orienting the wind rotor into the wind at all wind velocities. This is highly advantageous because it eliminates sliding hydraulic connections to the pump and permits placement of the pump at the bottom of the tower where it is accessible.

To summarize the steering system, the energy transducer (pump) produces a load-reaction torque T proportional to $V^2$. At the same time, the rotor trim tab produces a restoring torque proportional to $V^2$. Thus by design in any such system, the proportionality can be matched to produce an inherently stable steering system for all wind speeds.

As for the rotor-pump system, by virtue of the fact that the pump orifice absorbs energy from the rotor at the very same rate as the rotor absorbs energy from the wind, irrespective of wind speeds, a truly synergistic combination of wind rotor and load has been provided by this invention, providing a wind power system which is inherently self-regulating at its optimum power level.

Another type of flow device which generates heat is a length of tubing with turbulent fluid flow. Such a tube would fulfill the same mathematical function as the orifice, but it is not so precise and predictable. The characteristics of such a tube as a heat generator depend on fluid velocity, roughness of the flow surface, and Reynolds number. It would work as desired only at high fluid velocity; a pump loaded with this tube would reflect a no-load condition to the wind rotor at low wind velocities. This is undesirable.

What is claimed is:

1. A wind power system including:
   a wind rotor disposed to convert wind energy to mechanical energy at a rate in accordance with the relationship $$W \text{ rotor} \propto N^3 \propto V^3$$

wherein W is rotor power, N is rotational speed, and V is wind velocity,
   a positive displacement hydraulic pump operatively connected to said wind rotor to motivate fluid through a hydraulic fluid system and thereby to convert said mechanical energy to hydraulic energy at a rate in accordance with the relationship $$W \text{ pump} \propto N^3$$

wherein W is pump power and N is rotating speed,
   an orifice in said hydraulic system to convert said hydraulic energy to thermal energy at a rate in accordance with the relationship $$W \text{ heat} \propto Q \, \Delta P \propto N^3$$

wherein W heat is thermal power, Q is volume flowrate of fluid in said hydraulic system and $\Delta P$ is pressure drop across said orifice,
   said orifice being sized to create an optimum hydraulic load on said pump and rotor such that said rotor rotates at a substantially constant optimum ratio of rotor tip speed to wind velocity in accordance with the relationship $$N \propto V$$

wherein N is rotor speed and V is wind velocity.

2. A method of maximizing the conversion of wind energy to thermal energy in a wind power system, including the following steps:
   a. Converting wind energy to mechanical energy by means of a wind rotor,
   b. Converting said mechanical energy to hydraulic energy by means of a hydraulic pump in a hydraulic system,
   c. Converting said hydraulic energy to thermal energy by means of a flow constriction in said hydraulic system,
   d. Determining the power developed in said power system as a variable function of the flow constriction in said hydraulic system, and
   e. Setting the flow constriction in said hydraulic system at the size corresponding to the maximum of power developed.

3. A method of maximizing the conversion of wind energy to thermal energy in a wind power system, including the following steps:
   a. Converting wind energy to mechanical energy by means of a wind rotor,
   b. Converting said mechanical energy to hydraulic energy by means of a hydraulic pump in a hydraulic system,
   c. Converting said hydraulic energy to thermal energy by means of a flow constriction in said hydraulic system,
   d. Determining, by varying the flow constriction in said hydraulic system, the optimum ratio of rotor tip speed to wind speed at which power developed in said power system is at maximum for a given wind speed, and
   e. Setting the flow constriction in said hydraulic system at the size corresponding to said optimum ratio.

4. A method of maximizing the conversion of wind energy to thermal energy in a wind power system, including the followin steps:
   a. Converting wind energy to mechanical energy by means of a wind rotor at a ratio in accordance with the relationship:

$$W \text{ rotor} \propto N^3 \propto V^3$$

wherein W rotor is rotor power, N is rotor speed and V is wind velocity,
   b. Converting said mechanical energy to hydraulic energy by means of a hydraulic pump in a hydraulic system at a rate in accordance with the relationship:

$$W \text{ pump} \propto N^3$$

wherein W pump is pump power and N is rotor speed,
   c. Converting said hydraulic energy to thermal energy by means of a flow constriction in said hydraulic system at a rate in accordance with the relationship:

$$W_{heat} \propto Q\Delta P \propto N^3$$

wherein W heat is thermal power, Q is volume flowrate of fluid in said hydraulic system, $\Delta P$ is pressure drop across said flow constriction, and N is rotor speed, whereby said rotor power, said pump power, and said thermal power, all being proportional to $N^3$, are in balance at any rotor speed, d. Determining the power developed in said power system as a variable function of the flow constriction in said hydraulic system, and e. Setting the flow constriction in said hydraulic system at the size corresponding to the maximum of power developed so as to optimally load said wind rotor.

5. A method of steering a wind rotor into the wind including the following steps:

a. Converting wind energy to mechanical energy by means of said wind rotor connected to a mechanical load exerting a load-reaction torque on said rotor, tending to turn the axis of said rotor away from the wind direction, in accordance with the relationship:

$$T \propto V^2$$

wherein T is load-reaction torque and V is wind velocity, b. Converting wind energy to mechanical energy by means of a tail and trim tab mounted to said rotor and exerting a restoring torque on said rotor in the direction opposite to that of said load-reaction torque in accordance with the relationship:

$$T^1 \propto V^2$$

wherein $T^1$ is restoring torque and V is wind velocity, c. Determining the proportionality constants $V^2/T$ and $V^2/T^1$, and d. Adjusting the system parameters so that $$T = T^1 = kV^2$$

whereby said load-reaction torque and said restoring torque are equal and opposite at all wind velocities.

* * * * *